(12) United States Patent
von Mueller et al.

(10) Patent No.: US 8,144,940 B2
(45) Date of Patent: Mar. 27, 2012

(54) SYSTEM AND METHOD FOR AUTHENTICATION OF DATA

(76) Inventors: Clay von Mueller, San Diego, CA (US); Kirkpatrick W. Norton, San Diego, CA (US); Paul Elbridge Catinella, San Diego, CA (US)

( * ) Notice: Subject to any disclaimer, the term of this patent is extended or adjusted under 35 U.S.C. 154(b) by 899 days.

(21) Appl. No.: 12/188,114

(22) Filed: Aug. 7, 2008

(65) Prior Publication Data
US 2010/0034434 A1 Feb. 11, 2010

(51) Int. Cl.
*G06K 9/00* (2006.01)
*H04K 1/00* (2006.01)
*G05B 19/00* (2006.01)

(52) U.S. Cl. .......... 382/115; 340/5.83; 380/29; 382/100

(58) Field of Classification Search ............... 382/115, 382/119, 138, 140; 235/449, 493, 487, 380, 235/375, 382; 340/5.8–5.86
See application file for complete search history.

(56) References Cited

U.S. PATENT DOCUMENTS

| | | | |
|---|---|---|---|
| 3,953,887 A | 4/1976 | Kobylarz et al. | |
| 3,962,726 A | 6/1976 | DeLand et al. | |
| 4,028,734 A | 6/1977 | Mos | |
| 4,297,735 A | 10/1981 | Eppich | |
| 4,319,131 A | 3/1982 | McGeary et al. | |
| 4,628,195 A | 12/1986 | Baus | |
| 4,650,978 A | 3/1987 | Hudson et al. | |
| 4,705,939 A | 11/1987 | Ulinski | |
| 4,837,426 A | 6/1989 | Pease | |
| 4,906,988 A | 3/1990 | Copella | |
| 4,944,619 A | 7/1990 | Suzuki et al. | |
| 4,949,192 A | 8/1990 | McGreary | |
| 5,010,240 A | 4/1991 | Sheldon | |
| 5,097,504 A | 3/1992 | Camion et al. | |
| 5,101,097 A | 3/1992 | Conant | |
| 5,126,990 A | 6/1992 | Efron et al. | |
| 5,214,409 A | 5/1993 | Beigel | |
| 5,233,169 A | 8/1993 | Longacre | |
| 5,235,166 A * | 8/1993 | Fernadez ...................... 235/449 |
| 5,254,843 A | 10/1993 | Hynes et al. | |

(Continued)

FOREIGN PATENT DOCUMENTS
EP 0644474 3/1995
(Continued)

OTHER PUBLICATIONS

NuGen I.T., "Response to CCIF Parts and Material Committee", Enterprise Workflow, NuGen I.T., The Internet Integration Company.

(Continued)

*Primary Examiner* — Andrae S Allison
(74) *Attorney, Agent, or Firm* — Sheppard Mullin Richter & Hampton LLP

(57) ABSTRACT

Systems and methods for detecting forged magnetic stripe data through relative variations in flux transition location are provided. In one embodiment, the invention provides a method for detecting forged magnetic stripe data. The method provides for reading a magnetic strip multiple times to obtain multiple signatures and then generating a signature mask and weight based on the multiple signatures. These signatures are then compared with a known authentic signature. Based on the comparison results, a forged magnetic stripe may be detected. Additional embodiments focus on variations in the placement of the flux data transitions on the magnetic slurry rather than on the noise inherent in the slurry.

19 Claims, 9 Drawing Sheets

U.S. PATENT DOCUMENTS

| | | | |
|---|---|---|---|
| 5,257,320 | A | 10/1993 | Etherington et al. |
| 5,270,523 | A | 12/1993 | Chang et al. |
| 5,336,871 | A | 8/1994 | Colgate |
| 5,354,097 | A | 10/1994 | Tel |
| 5,358,088 | A | 10/1994 | Kryder et al. |
| 5,365,586 | A | 11/1994 | Indeck et al. |
| 5,367,581 | A | 11/1994 | Abel et al. |
| 5,393,966 | A | 2/1995 | Gatto et al. |
| 5,396,369 | A | 3/1995 | DeLand et al. |
| 5,408,505 | A | 4/1995 | Indeck et al. |
| 5,412,718 | A | 5/1995 | Narasimhalu |
| 5,428,683 | A | 6/1995 | Indeck et al. |
| 5,430,279 | A | 7/1995 | Fernadez |
| 5,459,629 | A | 10/1995 | Wakasugi |
| 5,461,525 | A | 10/1995 | Christianson et al. |
| 5,479,509 | A | 12/1995 | Ugon |
| 5,546,462 | A * | 8/1996 | Indeck et al. ............... 713/176 |
| 5,552,947 | A | 9/1996 | Nakanishi et al. |
| 5,569,898 | A | 10/1996 | Fisher et al. |
| 5,570,339 | A | 10/1996 | Nagano |
| 5,572,507 | A | 11/1996 | Ozaki et al. |
| 5,587,654 | A | 12/1996 | Indeck et al. |
| 5,603,078 | A | 2/1997 | Henderson |
| 5,616,904 | A * | 4/1997 | Fernadez ................... 235/449 |
| 5,625,689 | A | 4/1997 | Indeck et al. |
| 5,644,636 | A | 7/1997 | Fernandez |
| 5,657,389 | A | 8/1997 | Houvener |
| 5,685,657 | A | 11/1997 | Jablonski |
| 5,691,526 | A | 11/1997 | Evans |
| 5,708,422 | A | 1/1998 | Blonder et al. |
| 5,740,244 | A | 4/1998 | Indeck et al. |
| 5,767,495 | A | 6/1998 | DeLand |
| 5,770,846 | A | 6/1998 | Mos |
| 5,780,828 | A | 7/1998 | Mos et al. |
| 5,814,796 | A | 9/1998 | Benson et al. |
| 5,829,743 | A | 11/1998 | DeLand et al. |
| 5,920,628 | A | 7/1999 | Indeck et al. |
| 5,930,794 | A | 7/1999 | Linenbach et al. |
| 5,959,794 | A | 9/1999 | Indeck et al. |
| 6,024,288 | A | 2/2000 | Gottlich |
| 6,038,321 | A | 3/2000 | Torigai et al. |
| 6,053,406 | A | 4/2000 | Litman |
| 6,098,881 | A * | 8/2000 | DeLand et al. ............... 235/449 |
| 6,105,011 | A | 8/2000 | Morrison |
| 6,123,259 | A | 9/2000 | Ogasawara |
| 6,240,515 | B1 * | 5/2001 | Carnegie et al. ............. 713/182 |
| 6,260,146 | B1 | 7/2001 | Mos et al. |
| 6,266,647 | B1 | 7/2001 | Fernandez |
| 6,279,110 | B1 * | 8/2001 | Johnson et al. ............... 713/180 |
| 6,308,886 | B1 | 10/2001 | Benson et al. |
| 6,335,799 | B1 | 1/2002 | Provost |
| 6,430,008 | B1 | 8/2002 | Trabert et al. |
| 6,431,445 | B1 * | 8/2002 | DeLand et al. ............... 235/449 |
| 6,476,991 | B1 | 11/2002 | Fernandez |
| 6,480,356 | B1 | 11/2002 | Mos |
| 6,543,689 | B2 | 4/2003 | Sabella |
| 6,641,050 | B2 | 11/2003 | Kelley et al. |
| 6,644,547 | B1 | 11/2003 | White |
| 6,678,103 | B2 | 1/2004 | Fernandez et al. |
| 6,678,823 | B1 | 1/2004 | Fernandez |
| 6,760,841 | B1 | 7/2004 | Fernandez |
| 6,781,781 | B2 | 8/2004 | Wood |
| 6,830,182 | B2 | 12/2004 | Izuyama |
| 6,830,183 | B2 | 12/2004 | Von Mueller et al. |
| 6,837,435 | B2 | 1/2005 | Kehoe et al. |
| 6,871,784 | B2 * | 3/2005 | Jayaratne ................... 235/449 |
| 6,885,748 | B1 | 4/2005 | Wang |
| 6,899,269 | B1 | 5/2005 | DeLand |
| 6,901,375 | B2 | 5/2005 | Fernandez |
| 6,944,782 | B2 | 9/2005 | Von Mueller et al. |
| 6,963,980 | B1 | 11/2005 | Mattsson |
| 6,993,130 | B1 | 1/2006 | Fernandez et al. |
| 7,013,393 | B1 | 3/2006 | Stevens |
| 7,068,207 | B2 | 6/2006 | Fujita et al. |
| 7,068,787 | B1 | 6/2006 | Ta et al. |
| 7,103,575 | B1 | 9/2006 | Lineham |
| 7,113,930 | B2 | 9/2006 | Eccles |
| 7,120,933 | B2 | 10/2006 | Mattsson |
| 7,210,627 | B2 * | 5/2007 | Morley et al. ............... 235/449 |
| 7,305,707 | B2 | 12/2007 | Mattsson |
| 7,313,822 | B2 | 12/2007 | Ben-Itzhak |
| 7,325,129 | B1 | 1/2008 | Mattsson |
| 7,418,098 | B1 | 8/2008 | Mattsson |
| 7,490,248 | B1 | 2/2009 | Valfridsson |
| 7,539,857 | B2 | 5/2009 | Bartlett |
| 7,548,622 | B2 | 6/2009 | Carr |
| 7,967,203 | B2 * | 6/2011 | Fang et al. ............... 235/449 |
| 2001/0047355 | A1 | 11/2001 | Anwar |
| 2002/0017559 | A1 | 2/2002 | Mos et al. |
| 2002/0017560 | A1 | 2/2002 | Mos et al. |
| 2002/0023215 | A1 | 2/2002 | Wang et al. |
| 2002/0046338 | A1 | 4/2002 | Ueda et al. |
| 2002/0145051 | A1 | 10/2002 | Charrin |
| 2002/0152180 | A1 | 10/2002 | Turgeon |
| 2002/0178145 | A1 | 11/2002 | Ishida |
| 2003/0028481 | A1 | 2/2003 | Flitcroft et al. |
| 2003/0061156 | A1 | 3/2003 | Lim |
| 2003/0061171 | A1 | 3/2003 | Gilbert et al. |
| 2003/0085277 | A1 | 5/2003 | DeLand et al. |
| 2003/0089774 | A1 | 5/2003 | Schmieder et al. |
| 2003/0105725 | A1 | 6/2003 | Hoffman |
| 2003/0105967 | A1 | 6/2003 | Nam |
| 2003/0145205 | A1 | 7/2003 | Sarcanin |
| 2003/0146846 | A1 | 8/2003 | Fujita et al. |
| 2003/0192948 | A1 | 10/2003 | Izuyama |
| 2003/0213840 | A1 | 11/2003 | Livingston et al. |
| 2004/0006699 | A1 | 1/2004 | Von Mueller |
| 2004/0049777 | A1 | 3/2004 | Sullivan |
| 2004/0203930 | A1 | 10/2004 | Farchmin et al. |
| 2004/0238627 | A1 | 12/2004 | Silverbrook et al. |
| 2005/0036611 | A1 | 2/2005 | Seaton |
| 2005/0044044 | A1 | 2/2005 | Burger et al. |
| 2005/0167495 | A1 | 8/2005 | Morley et al. |
| 2005/0167496 | A1 | 8/2005 | Morely et al. |
| 2005/0173530 | A1 | 8/2005 | DeLand et al. |
| 2005/0184165 | A1 | 8/2005 | Jong |
| 2005/0198318 | A1 | 9/2005 | Von Mueller |
| 2005/0218229 | A1 | 10/2005 | Morley et al. |
| 2005/0228688 | A1 | 10/2005 | Visser et al. |
| 2005/0247787 | A1 | 11/2005 | Von Mueller |
| 2006/0046842 | A1 | 3/2006 | Mattice et al. |
| 2006/0049255 | A1 | 3/2006 | Von Mueller |
| 2006/0049256 | A1 | 3/2006 | Von Mueller |
| 2006/0061503 | A1 | 3/2006 | Fujita et al. |
| 2006/0179296 | A1 | 8/2006 | Bartlett |
| 2006/0249574 | A1 | 11/2006 | Brown et al. |
| 2007/0067634 | A1 | 3/2007 | Siegler |
| 2007/0067637 | A1 | 3/2007 | Mattsson |
| 2007/0101425 | A1 | 5/2007 | Mattsson |
| 2007/0242829 | A1 | 10/2007 | Pedlow |
| 2008/0022136 | A1 | 1/2008 | Mattsson |
| 2008/0082834 | A1 | 4/2008 | Mattsson |
| 2008/0082837 | A1 | 4/2008 | Mattsson |
| 2008/0084995 | A1 | 4/2008 | Rodgers |
| 2008/0098393 | A1 | 4/2008 | Chai et al. |
| 2008/0165973 | A1 | 7/2008 | Miranda Gavillan et al. |
| 2008/0170693 | A1 | 7/2008 | Spies et al. |
| 2008/0215887 | A1 * | 9/2008 | Hart et al. ............... 713/172 |
| 2009/0025057 | A1 | 1/2009 | Mattsson |
| 2009/0089591 | A1 | 4/2009 | Mattsson |

FOREIGN PATENT DOCUMENTS

| | | |
|---|---|---|
| EP | 1363226 | 5/2002 |
| EP | 1460593 | 9/2004 |
| WO | 97/30533 | 8/1997 |
| WO | 01/65512 | 9/2001 |
| WO | 02/43014 | 5/2002 |
| WO | 02/43015 | 5/2002 |
| WO | 02/067157 | 8/2002 |
| WO | 2006/010947 | 2/2006 |
| WO | 2006/020320 | 2/2006 |
| WO | 2006/111022 | 10/2006 |
| WO | 2008/100396 | 8/2008 |

OTHER PUBLICATIONS

CCC Information Services, Inc., "How to Read an Estimate Quality Review," (2005), http://www.ccis.com.

M. Bellare, K. Pietrzak, and P. Rogaway. Improved Security Analyses for CBC MACs. Advances in Cryptology—CRYPTO '05, LNCS vol. 3621, pp. 527-545, Springer, 2005.

Bellare, M., Rogaway, P. The Security of Triple Encryption and a Framework for Code-Based Game-Playing Proofs. Advances in Cryptology—EUROCRYPT '06, LNCS vol. 4004, pp. 409-426, Springer, 2006.

M. Bellare, A. Boldyreva, and A. O'Neill. Deterministic and efficiently searchable encryption. Advances in Cryptology—CRYPTO '07, LNCS vol. 4622, pp. 535-552, Springer, 2007.

M. Bellare, M. Fischlin, A. O'Neill, and T. Ristenpart. Deterministic encryption: Definitional equivalences and constructions without random oracles. Advances in Cryptology—CRYPTO '08, LNCS vol. 5157, pp. 360-378, Springer, 2008.

J. Black and P. Rogaway. CBC MACs for Arbitrary-Length Messages: The Three-Key Constructions. J. of Cryptology, vol. 18, No. 2, pp. 111-131, 2005.

J. Black and P. Rogaway. Ciphers with arbitrary finite domains. Topics in Cryptology—CT-RSA '02, LNCS vol. 2271, Springer, pp. 114-130, 2002.

J. Black, S. Halevi, H. Krawczyk, T. Krovetz, and P. Rogaway. UMAC: Fast and Secure Message Authentication. Advances in Cryptology—CRYPTO '99, LNCS vol. 1666. pp. 216-233, Springer, 1999.

J. Black and P. Rogaway. A Block-Cipher Mode of Operation for Parallelizable Message Authentication. Advances in Cryptology—Eurocrypt '02, LNCS vol. 2332, pp. 384-397, Springer, 2002.

A. Boldyreva, S. Fehr, and A. O'Neill. On notions of security for deterministic encryption, and efficient constructions without random oracles. Advances in Cryptology—CRYPTO '08, LNCS vol. 5157, pp. 335-359 Springer, 2008.

ISO/IEC 7812-1:2006. Identification cards—Identification of issuers—Part 1: Numbering system.

T. Iwata and K. Kurosawa. OMAC: One-Key CBC MAC. Fast Software Encryption—FSE '03, LNCS vol. 2887, pp. 129-153, Springer, 2003.

M. Liskov, R. Rivest, and D. Wagner. Tweakable block ciphers. Advances in Cryptology—CRYPTO 2002, LNCS vol. 2442, Springer, pp. 31-46, 2002.

M. Luby and C. Rackoff. How to construct pseudorandom permutations from pseudorandom functions. SIAM Journal of Computing, vol. 17, No. 2, pp. 373-386, 1988.

S. Lucks. Faster Luby-Rackoff ciphers. Fast Software Encryption 1996, LNCS vol. 1039, Springer, pp. 189-203, 1996.

U. Maurer and K. Pietrzak. The Security of Many-Round Luby-Rackoff Pseudo-Random Permutations. Advances in Cryptology—EUROCRYPT '03, LNCS vol. 2656, pp. 544-561, Springer, 2003.

M. Naor and O. Reingold. On the construction of pseudorandom permutations: Luby-Rackoff revisited. Journal of Cryptology, vol. 12, No. 1, pp. 29-66, 1999.

J. Patarin. New Results on Pseudorandom Permutation Generators Based on the DES Scheme. Advances in Cryptology—CRYPTO '91, LNCS vol. 576, Springer, pp. 301-312, 1991.

J. Patarin. Generic Attacks on Feistel Schemes. Advances in Cryptology—ASIACRYPT '01, LNCS vol. 2248, Springer, pp. 222-238, 2001.

J. Patarin. Luby-Rackoff: 7 Rounds Are Enough for 2n(1-Q) Security. Advances in Cryptology—CRYPTO '03, LNCS vol. 2729, Springer, pp. 513-529, 2003.

J. Patarin. Security of Random Feistel Schemes with 5 or More Rounds. Advances in Cryptology—CRYPTO '04, LNCS vol. 3152, Springer, pp. 106-122, 2004.

S. Patel, Z. Ramzan, and G. Sundaram. Efficient constructions of variable-input-length block ciphers. Selected Areas in Cryptography 2004, LNCS vol. 3357, pp. 326-340, 2004.

PCI Security Standards Council. Payment Card Industry Data Security Standard Version 1.2. Available from https://www.pcisecuritystandards.org/security_standards/pci_dss.shtml.

B. Schneier and J. Kelsey. Unbalanced Feistel networks and block cipher design. Fast Software Encryption 1996, LNCS vol. 1039, Springer, pp. 121-144, 1996.

R. Schroeppel. Hasty pudding cipher specification. First AES Candidate Workshop, 1998.

T. Spies. Feistel Finite Set Encryption Mode. http://csrc.nist.gov/groups/ST/toolkit/15 BCM/documents/proposedmodes/ffsem/ffsem-spec.pdf.

Mattson, Ulf T., Format-Controlling Encryption Using Datatype-preserving Encryption.

Mattson, Ulf T., DB2 Security and PCI Compliance: A Best Practice Guide,.

Satti, M.V. Kartik, A Quasigroup Based Cryptographic System.

Cisco Systems. Security: AP/Root Radio Data Encryption.

Crocker, David H., Standard for the Format of ARPA Internet Text Messages, RFC 822, Aug. 13, 1982.

* cited by examiner

FIG. 6

| | CMP | CMP | CMP | CMP | OFF 1 | OFF 1 | OFF 1 | OFF 2 | OFF 2 | OFF 2 | OFF 3 | OFF 3 | OFF 1 | OFF 1 | OFF 1 | OFF 1 |
|---|---|---|---|---|---|---|---|---|---|---|---|---|---|---|---|---|
| TEST | T<=1 | T<=0 | T>=0 | T>=1 | T<=1 | T<=0 | T>=0 | T<=1 | T<=0 | T>=1 | T<=1 | T>=1 | T<=1 | T<=0 | T>=0 | T>=1 |
| MASK | M<=1 | M<=0 | M>=0 | M>=1 | M<=0 | M<=1 | M>=1 | M>=0 | M>=1 | M<=0 | M>=1 | M>=1 | M<=0 | M<=1 | M<=0 | M>=0 |
| SCORE | W*C | W*C | W*C | W*C | W1*C | W1*C | W1*C | W2*C | W2*C | W2*C | W3*C | W3*C | W1*C | W1*C | W1*C | W1*C |

FIG. 7

| POS 1 | POS 2 | POS 3 | POS 4 | POS 5 | POS 6 | POS 7 | POS 8 | POS 9 | POS 10 | POS 11 | POS 12 |
|---|---|---|---|---|---|---|---|---|---|---|---|
| 16/15 | 23/15 | 23/15 | 09/25 | 08/25 | 27/25 | 33/20 | 33/20 | 34/15 | 61/5 | 03/20 | 03/20 |
| 06/15 | 06/15 | 9/20 | | | | 57/10 | 57/10 | 33/5 | 62/5 | 48/20 | 48/20 |
| | | | | | | | | 57/5 | 63/5 | | |
| | | | | | | | | | 64/5 | | |

| CMP POS-5 | CMP POS-4 | CMP POS-3 | CMP POS-2 | CMP POS-1 | TEST POS | CMP POS+1 | CMP POS+2 | CMP POS+3 | CMP POS+4 | CMP POS+5 |
|---|---|---|---|---|---|---|---|---|---|---|
| 6 | 7 | 8 | 9 | 10 | - | 10 | 9 | 8 | 7 | 6 |

FIG. 8

| POS 1 20 | POS 2 16 | POS 3 06 | POS 4 09 | POS 5 08 | POS 6 27 | POS 7 03 | POS 8 57 | POS 9 33 | POS 10 34 | POS 11 61 | POS 12 48 | SUM |
|---|---|---|---|---|---|---|---|---|---|---|---|---|
| 0 | 0 | 0 | 25 | 25 | 25 | 0 | 20 | 5 | 0 | 20 | 20 | 150 |

SECONDARY TABLE COMPARE

| POS 1 20 | POS 2 16 | POS 3 06 | POS 4 09 | POS 5 08 | POS 6 27 | POS 7 03 | POS 8 57 | POS 9 33 | POS 10 34 | POS 11 61 | POS 12 48 | SUM |
|---|---|---|---|---|---|---|---|---|---|---|---|---|
| 10 | 0 | 9 | - | - | - | 7 | - | - | 9 | - | - | 45 |

COMPARISON SUM 150+45=195 OF 300

FIG. 9

| BEST -5 | BEST -4 | BEST -3 | BEST -2 | BEST -1 | BEST MATCH MPAD | BEST +1 | BEST +2 | BEST +3 | BEST +4 | BEST +5 | BEST +6 |
|---|---|---|---|---|---|---|---|---|---|---|---|
| -5 | -6 | -7 | -8 | -9 | -10 | -9 | -8 | -7 | -6 | -5 | -4 |

FIG. 10

DEDUCTION TABLE

| POS 1 | POS 2 | POS 3 | POS 4 | POS 5 | POS 6 | POS 7 | POS 8 | POS 9 | POS 10 | POS 11 | POS 12 | SUM |
|---|---|---|---|---|---|---|---|---|---|---|---|---|
| 20 | 16 | 06 | 09 | 08 | 27 | 03 | 57 | 33 | 34 | 61 | 48 | |
| -5 | - | - | - | - | - | - | - | - | - | - | - | -5 |

MASK SCORE=195−5=190

FIG. 11

SYSTEM AND METHOD FOR AUTHENTICATION OF DATA

TECHNICAL FIELD

Some embodiments of the present invention relate to detecting forged magnetic stripe data through relative variations in flux transition location.

DESCRIPTION OF THE RELATED ART

Token systems have been in use in modern civilization in various implementations to provide and control many forms of access. Access that can be and often times is controlled by tokens can include physical access to rooms, buildings, areas and so on; electronic access to servers and data files; electronic account access; and so on. Another form of access controlled by tokens is the ability to conduct transactions such as, for example, credit, debit and other financial transactions. Credit cards, charge cards, debit cards, loyalty cards and other purchase-related tokens are used to provide the consumers with ready access to funds. Such transactions can enhance convenience of purchases, extend credit to customers, and so on.

As modern society has evolved, so have our tokens. Early tokens included physical objects such as coins, documents, and other physical objects. One example of a simple physical object token is the subway token made famous by the New York subway system. This simple token resembled a coin and could be purchased at kiosks and were used to control access to the subway system. Another example of simple physical token for granting access was the early railway token developed in the 19$^{th}$ century for the British railway system. This token was a physical object, such as a coin, that a locomotive engineer was required to have before entering a particular section of the railway. When the train reached the end of the section, the driver left the token at a drop point so it could be to be used by the next train going the other way. Because there was only one token for a given section of railway, the token system helped to ensure that only one train would be on that section of the track at a given time.

The railway token system minimized the likelihood of head on collisions, but this simple token also limited the ability for trains to follow one another along a given section. As such, the system evolved into a token and ticket system. In this system, if a train reached a checkpoint and the token was present, the driver was given a ticket to pass, leaving the token in place in case another train approached that section travelling in the same direction. Safeguards were implemented to ensure that tickets were correctly issued. As technology evolved, the physical token and ticket system evolved to include electronic signaling to control access to sections of the railway.

Another example of tokens to grant access are charge cards, credit cards and debit cards. Some attribute the 'invention' of credit cards to Edward Bellamy, who described them in his 19$^{th}$ century novel *Looking Backward*. Early cards were reportedly used in the early 20$^{th}$ century United States by fuel companies and by Western Union. By mid century, Diners Club produced a charge card for merchant purchases, which was followed shortly thereafter by American Express. These cards, now ubiquitous in our society, allow customers to make purchases and conduct transactions with relative ease. Early cards were embossed with a customer account number, which was manually transferred to a receipt via a carbon transfer process. Modern cards, or tokens, have evolved to use electronic mechanisms of storing data including, for example, magnetic stripes, RFID tags, and smart card and chip card technologies. As modern cards have become more widely used, especially for banking and other transactions, the need to protect the data on the magnetic strip on the card has become more important.

Other examples of tokens include government issued IDs such as driver's licenses and passports. Such tokens can also be used to control access in various forms. For example, a passport can be used to control access to countries and regions. Passports can also be used to access employment and licensing opportunities as a document to prove the holder's citizenship. A driver's license is another form of token, allowing access to driving privileges, and to establishments requiring proof of identity, residency or age. Still other examples of tokens can include bank drafts, stock certificates, currency and other token items relating to finance. Still further token examples can include tokens for physical access and security such as keys, card keys, RF or LC cards, RFID tokens, toll road transponders, and the like.

As these examples illustrate, the use of tokens for various forms of access has gained popularity in various business and industries and has evolved to embrace newly developed technologies. Tokens are not limited to these examples, but can take on various forms and use various instrumentalities and control, govern or arbitrate various forms of access in a variety of different ways. One downside of token access, however, is the opportunity to defraud the system. For example, stolen or counterfeited tokens are often used to gain unauthorized access. In fact, the Federal Trade Commission reports that credit and charge card fraud costs cardholders and issuers hundreds of millions of dollars each year. As the importance of token access has grown so has the ability of those seeking to defraud the system. These attackers seek to gain access through decrypting the access code and often use sophisticated computer algorithms to attack token security. Such attacks may take the form of repetitive attempts to access the protected system, with each attempt providing additional information. In some cases, the attacker may have access to a merchant terminal and be able to create and swipe cards of its choice. In cryptographic terms, this is known as a chosen plaintext attack. Security is improved when an attacker must make a tremendous number of encryption queries or invest an unreasonable amount of computation time to successfully decipher the information. Other attacks may also involve stolen tokens or credit cards. An identify thief may copy a stolen card, replicating the magnetic strip data and then attempt to use the card to obtain cash or services.

Methods have been developed to detect fraudulent magnetic stripe data. Three basic approaches have been used to differentiate between the original document or magnetic stripe and a copy. The noise signature method relies on the background noise created by the magnetic slurry. A second approach measures the magnetic stripe jitter as defined in the ISO 7811 specification. In both of the above methods a jitter signature or noise signature is created by reading the original document magnetic stripe and creating a signature from it. This signature is then compared with future card swipes to determine authenticity. A third method, used in an embodiment of this invention is relative spatial variation (RSV) measurement, which measures relative spatial variations in the placement of specific events on the magnetic stripe. These events may be a multiple of bit transitions, the relationship of bit transitions between multiple tracks of data, or the relative deviation in placement of specific events in relation to each other.

All of the above method seek to differentiate between the original document and fraudulent copies. However, problems exist with both noise signature and magnetic stripe jitter methods. The noise signature from the card's magnetic slurry changes over time and the signature must compensate for this change. In this method, the card's magnetic slurry properties are measured to create a signature. This signature may be measured even if the there is no data on the magnetic stripe being measured. The best signature from those signatures deemed genuine is chosen to serve as the test signature for future noise signatures. Since the noise signature describes the noise pattern of the magnetic slurry, the selected reference pattern is compared to the pattern in quest and the result is given a correlation value. The result of the correlation indicates the probability of authenticity of the noise signature in question. The "best" signature is selected as the golden signature to be used for comparison.

There is a need in the art for an improved method of authenticating magnetic stripe signatures.

BRIEF SUMMARY OF EMBODIMENTS OF THE INVENTION

The present invention improves on the process in an embodiment by generating a signature mask based on at least one signature. Additional embodiments focus on variations in the placement of the flux data transitions on the magnetic slurry rather than on the noise inherent in the slurry.

The present application provides a method for detecting forged magnetic stripe data by reading a magnetic stripe at least once to obtain at least one signature. The method then generates a signature mask based on the signature. One or more signatures are then compared to a known authentic signature. Based on the results of the comparison, a forged magnetic stripe is detected.

A computer program product is also provided for detecting forged magnetic stripe data. The computer program product comprises a computer readable medium with computer logic embodied on the medium. The computer logic causes the computer to detect forged magnetic stripe data. The first computer readable program code causes reading a magnetic strip. Second computer readable program code generates a signature mask based on at least one signature. Third computer readable program code compares the signature to a known authentic signature. The fourth computer readable program code using the comparison of the signature to determine a forged magnetic stripe.

A processor configured to detect forged magnetic stripe data is also provided. The processor includes control logic for reading a magnetic strip at least once to obtain a signature. In addition, control logic for generating a signature mask based on the signature is provided. Additional control logic for comparing the signature to a known authentic signature is provided along with control logic for determining a forged magnetic stripe using the comparison result.

An apparatus is also provided. The apparatus is configured to detect forget magnetic stripe data. The apparatus includes means for reading a magnetic strip to obtain at least one signature. In addition, means for generating a signature mask based on the signature is provided. Means are also provided for comparing the signature to a known authentic signature along with means for determining a forged magnetic stripe based on the signature.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 6 is a comparison table for enhanced per point resolution according to an embodiment of the invention.

FIG. 7 is a Mask MPAD location/weight table according to an embodiment of the invention.

FIG. 8 is a Secondary Mark MPAD location/weight table according to an embodiment of the invention.

FIG. 9 is a Primary and Secondary comparison table according to an embodiment of the invention.

FIG. 10 is a Deduction table according to an embodiment of the invention.

FIG. 11 is a Deduction table according to another embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Various embodiments described herein are directed toward a system and method for detecting forged token data, such as for example: magnetic stripe, or magstripe, data through relative variations in flux transition location.

Figure 1:
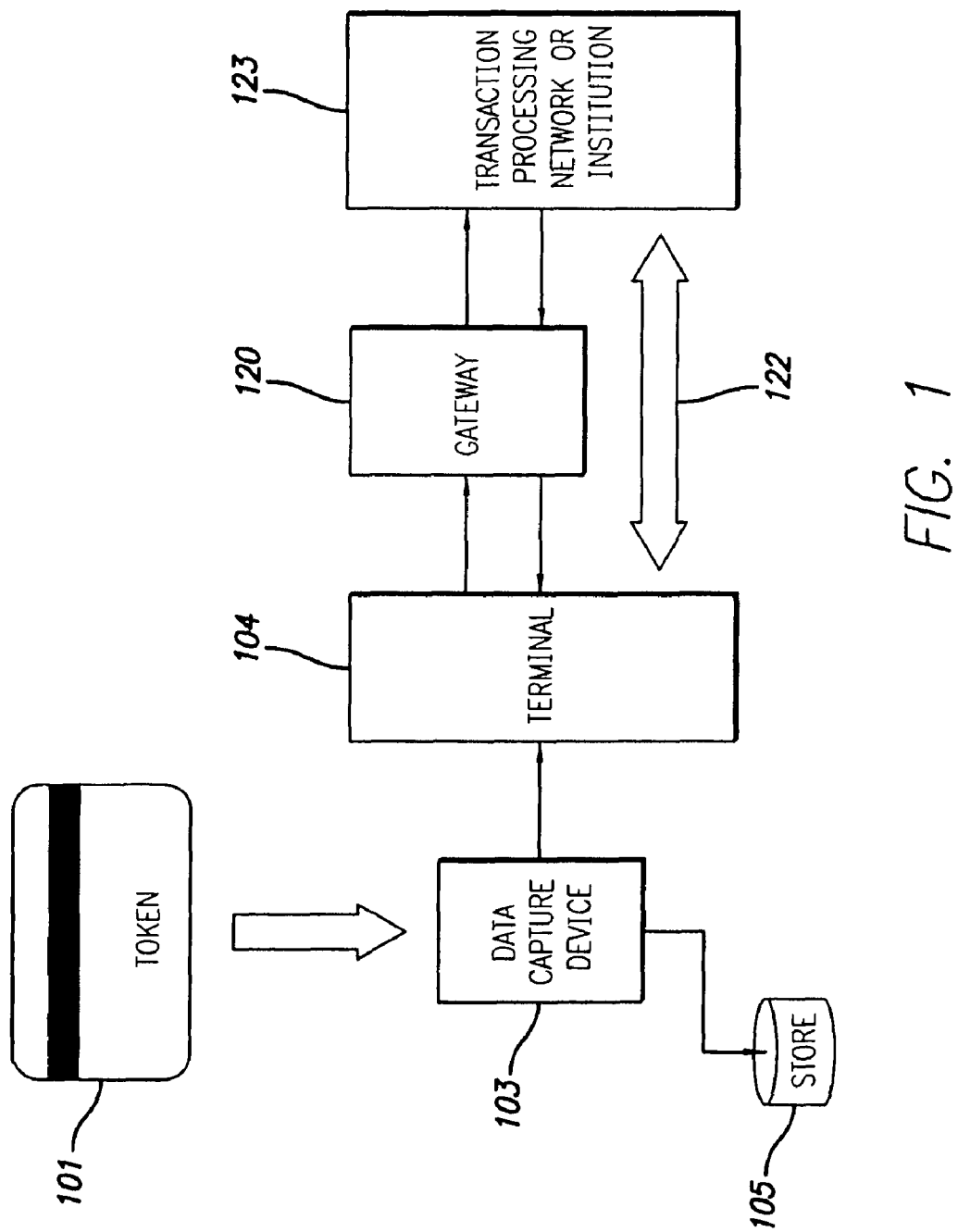
FIG. 1 is a diagram illustrating one example of a transaction network with which the present invention can be implemented.

Before describing the invention in detail, it is useful to describe an example environment with which the invention can be implemented. One such example is that of a transaction card network including a token used to facilitate purchases or other transactions. FIG. 1 is a diagram illustrating one example of a transaction network with which the present invention can be implemented. Referring now to FIG. 1, an example of transaction network is a token network that can be used to authorize and settle purchases of various goods and services. Illustrative examples of implementations of such a transaction network are the charge card, credit card and debit card transaction networks used to facilitate purchase transactions and banking transactions by and among merchants and other businesses, banks and other financial institutions and individuals. Generally speaking, in such a transaction network, the customer utilizes a charge card, credit card, debit card or other token as a symbol of his or her identity, or as an identification of the account he or she would like to have charged for the transaction. The token is typically accepted by the merchant, the account information read, and used to credit the transaction. The card is typically read using a card reader or data capture device with a head designed to read the data stored on multiple tracks within the magnetic strip on the card. Merchants may ask for a driver's license or other form of identification to verify the identity of the purchaser in conjunction with the token issued.

The token data is then sent to the appropriate financial institution or institutions, or other entities for processing. Processing can include, in one or more steps, authorization, approval and settlement of the account. As the example in FIG. 1 illustrates, a token 101 can be used by the customer to facilitate the transaction. As stated, in this example environment, examples of token 101 can include a charge card, debit card, credit card, loyalty card, or other token that can be used to identify such items as the customers, their account, and other relevant information. As such, a properly encoded token can include various forms of information relating to the purchaser such as, for example, the identity of the purchaser, information associated with the purchaser's account, the issuing bank or other financial institution, the expiration date, and so on.

As only one example of a token 101, a credit card can be used with a conventional magnetic stripe included on one side thereof. Conventional magnetic stripes can include three tracks of data. Further to this example, the ISO/IEC standard 7811, which is used by banks, specifies: that track one is 210 bits per inch (bpi), and holds 79 six-bit plus parity bit read-only characters; track two is 75 bpi, and holds 40 four-bit plus parity bit characters; and track three is 210 bpi, and holds 107 four-bit plus parity bit characters. Most conventional credit cards use tracks one and two for financial transactions. Track three is a read/write track (that includes an encrypted PIN, country code, currency units, amount authorized), but its usage is not standardized among banks.

In a conventional credit card token, the information on track one is contained in two formats. Format A, is reserved for proprietary use of the card issuer. Format B includes the following:
　　Start sentinel—1 character
　　Format code="B"—1 character (alpha only)
　　Primary account number—up to 19 characters
　　Separator—1 character
　　Country code—3 characters
　　Name—2-26 characters
　　Separator—1 character
　　Expiration date or separator—4 characters or 1 character
　　Discretionary data—enough characters to fill out maximum record length (79 characters total)
　　End sentinel—1 character
　　Longitudinal Redundancy Check (LRC), a form of computed check character—1 character
The format for track two can be implemented as follows:
　　Start sentinel—1 character
　　Primary account number—up to 19 characters
　　Separator—1 character
　　Country code—3 characters
　　Expiration date or separator—4 characters or 1 character
　　Discretionary data—enough characters to fill out maximum record length (40 characters total)
　　LRC—1 character Upon entering into a transaction, a merchant may ask the customer to present his or her form of payment, which in this example is the credit card. The customer presents the token 101 (e.g., credit card) to the merchant for use in the transaction terminal 104. In one embodiment, the credit card can be swiped by a magnetic stripe reader or otherwise placed to be read by the data capture device 103. In the current example where a credit card utilizing a magnetic stripe is the token 101, data capture device 103 can include any of a variety of forms of magnetic stripe readers to extract the data from the credit card. Other forms of data capture devices 103, or readers, may also be used to obtain the information from token 101.

The data capture device is in communicative contact with a terminal 104, which can include any of a number of terminals including, for example, a point of sale terminal, point of access terminal, an authorization station, automated teller machine, computer terminal, personal computer, work station, cell phone, PDA, handheld computing device and other data entry devices. Although in many applications the data capture device 103 is physically separated, but in communicative contact with, the terminal 104, in other environments these items can be in the same housing or in integrated housings. For example, terminals such as those available from companies such as Ingenico, Verifone, Apriva, Linkpoint, Hypercom and others.

Continuing with the credit card example, the customer or cashier can swipe the customer's credit card using the card-swipe device, which reads the card data and forwards it to the cashier's cash register or other terminal 104. In one embodiment, the magnetic stripe reader or other data capture device 103 is physically separated, but in communicative contact with, the terminal 104. In other environments these items can be in the same housing or in integrated housings. For example, in current implementations in retail centers, a magnetic stripe reader may be placed on a counter in proximity to a customer, and electronically coupled to the cash register terminal. The cash register terminal may also have a magnetic stripe reader for the sales clerk's use.

The customer may be asked to present a form of ID to verify his or her identity as imprinted on the token 101. For other transactions such as debit card transactions, the user may be required to key in a PIN or other authentication entry.

Continuing with the current credit card example, the terminal 104 can be configured to print out a receipt (or may display a signature page on a display screen) and the customer may be required to sign for his or her purchases, thus providing another level of authentication for the purchase. In some environments, terminal 104 can be configured to store a record of the transaction for recordkeeping and reporting purposes. Further, in some environments, a record of the transaction may be kept for later account settlement.

Typically, before the transaction is approved, terminal 104 seeks authorization from one or more entities in a transaction processing network 123. For example, the merchant may seek approval from the acquiring bank, the issuing bank, a clearing house, or other entity that may be used to approve such transactions. Thus, depending on the token type, institutions involved and other factors, the transaction processing network 123 can be a single entity or institution, or it can be a plurality of entities or institutions. As a further example, in one embodiment, transaction processing network may include one or more processors or clearing houses to clear transactions on behalf of issuing banks and acquiring banks.

The transaction processing network also include those issuing banks and acquiring banks. For example, one or more entities such as Global Payments, Visa, American Express, and so on, might be a part of transaction processing network. Each of these entities may have one or more processing servers to handle transactions.

As illustrated in FIG. 1, a gateway 120 can be included to facilitate routing of transactions, authorizations and settlements to and from the appropriate entity or entities within the transaction processing network 123. For example, where a merchant accepts credit cards from numerous different institutions, the gateway can use the BIN (Bank Identification Number) obtained from token 101 and passed to gateway 120 to route the transaction to the institution(s) associated with the given BIN. As illustrated by flow arrow 122, not all transactions are necessarily routed through a gateway 120. Transactions may take other paths to the appropriate entity or entities in the transaction processing network 123. Additionally, the term gateway as used herein is not restricted to conventional gateway applications, but is broad enough to encompass any server or computing system configured to perform any or all of the described functionality. The term gateway is used for convenience only.

Although transaction processing network 123 is illustrated using only one block in the example block diagram environment of FIG. 1, this block can represent a single entity to which the transaction is routed for authorization or settlement, or a network of entities that may be involved with authorization and settlement. Communications among the various components in the example environment can be wired or wireless transmissions using a variety of communication technologies formats and protocols as may be deemed appropriate for the given environment. As one example, the currently available credit card processing network and protocol structure can be utilized as the environment with which embodiments of the invention can be implemented. Various features and functions of the invention can be implemented within current or legacy transaction processing networks to provide enhanced security.

Having thus described an example environment, the present invention is from time-to-time described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2:
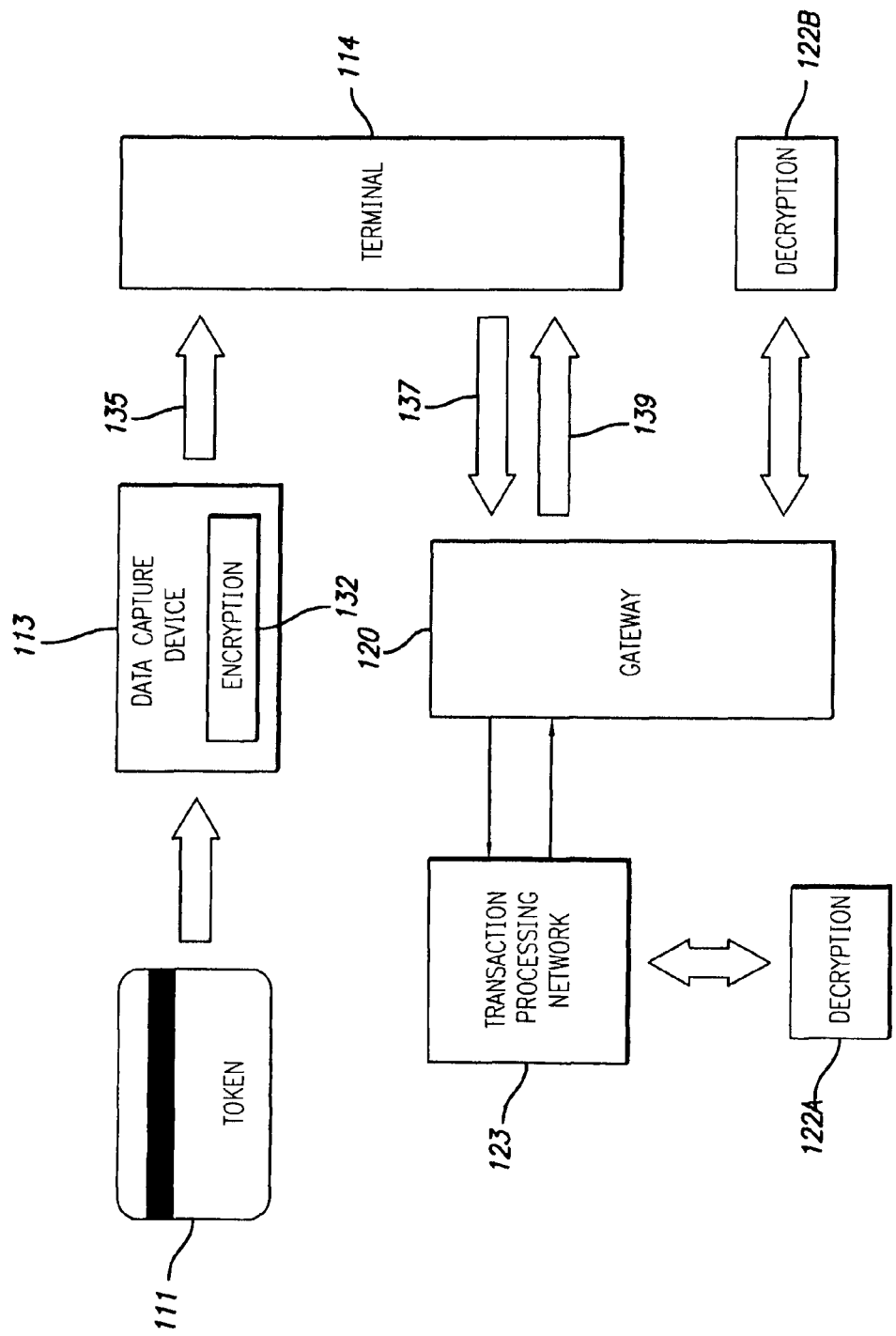
FIG. 2 is a diagram illustrating an implementation of features that can be associated with the invention in accordance with one embodiment of the invention.
Figure 3:
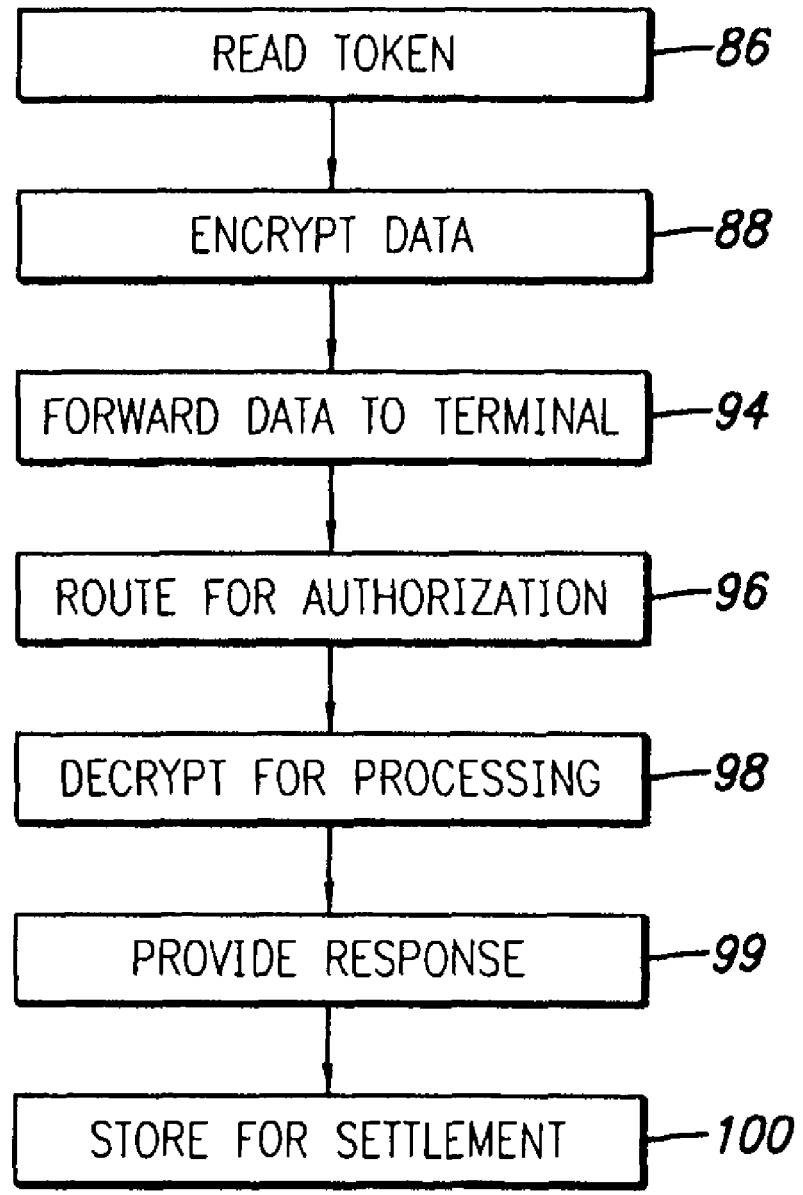
FIG. 3 is an operational flow diagram illustrating a process for enabling secure token transactions in accordance with one embodiment of the invention.

FIGS. 2 and 3 are diagrams illustrating an example implementation of features and functionality associated with embodiments of the invention operating within a network. FIG. 2 is a diagram illustrating an implementation of features that can be associated with the invention in accordance with embodiments of the invention. Referring now to FIGS. 2 and 3, in a Step 86, data from a token 111 with a magnetic stripe is read by a data capture device 113.

Although token data may be referred to as being "on" for "in" a token, or encoded "onto" or "into" a token, such as token 111, these terms are not meant to imply or require a particular physical structure for encoding the token with data.

In a step 88, an encryption module 132, which can include one or more encryption algorithms, is used to encrypt some or all of the token data. Although the encryption in accordance with the invention can take place at a number of different points along the data stream, it is preferable for security purposes that the encryption take place as soon as possible or practical in the data read cycle. Therefore, in one embodiment of the invention, the encryption module is in the data path immediately following the data capture. Preferably, then, the data can be encrypted as soon as it is read to enhance the security of the system.

In a step 94, the data captured by data capture device 113, and encrypted with encryption module 132, is forwarded to terminal 114 in furtherance of the transaction. In an application in accordance with the example environment, terminal 114 can include a cash register or other point of sale station or terminal, as an example. In other environments terminal 114 can be implemented as appropriate including, for example, checkpoint terminals, customs station terminals, point of access terminals, point of sale terminals, or other terminal appropriate for the given application.

In the application of a point of sale terminal, the terminal 114 can, in one embodiment, be a card swipe terminal such as, for example, portable or countertop terminals provided by VERIFONE, INGENICO and others. Other point of sale terminals might include, for example, gas pumps, ATM machines, vending machines, remote pay terminals, and so on. As another example, a terminal might include a token reader in communicative contact with a personal computer or other computing device for purchases such as, for example, internet purchases or for online banking. As a further example, in one embodiment, the terminal can include a magnetic stripe reader (including one or more read heads), a keypad (for example, for PIN entry, or other user entry), and a display. Thus, in this embodiment, the terminal 114 is integrated into the same package or housing as the data capture device 113. The terminal can also be integrated with or in communicative contact with a cash register or other point-of-sale or point-of-access station.

Illustrated in FIG. 2, is a secure data stream 135 in which some or all of the data has been encrypted by encryption module 132 before transmission to terminal 114. In a step 94, secure data stream 135 is forwarded to terminal 114 in furtherance of the transaction. As such, terminal 114 can use or forward some or all of the elements of data stream 135 as appropriate in conducting the transaction. Continuing with the example of a credit card sale, terminal 114, such as a point of sale terminal or a card-swipe terminal, can use this transaction data to obtain authorization for the transaction, obtain user input (for example, press "Yes" to approve the sale) as well as to print the receipts (or communicate with a cash register or other device to print receipts) or otherwise consummate the transaction.

In a step 96, terminal 114 routes the data to the transaction processing network 123 to obtain authorization or approval for the transaction from one or more entities as appropriate. The data stream 137 routed by terminal 114 can include some or all of the data provided in the secure data stream 135, and can be augmented to provide additional data as may be appropriate for the environment or type of transaction.

Illustrated in the example provided in FIG. 2 is a gateway 120 that also can be used to route the data stream. As discussed above with reference to FIG. 1, a gateway 120 may or may not be involved in the transaction routing depending on the application or transaction and the network configuration and participants, and other parameters such as, for example, the complexity of the network and the routing options available. For example, where multiple terminals 114 can be used to carry out transactions for credit cards from a plurality of issuing authorities, a gateway functionality can be useful to route the transaction data among the terminals and the elements of the transaction processing network.

As also discussed above with reference to FIG. 1, as used herein, the term "gateway" is broadly used to describe an entity, such as a server or other processing system, in the transaction stream that can be included to perform functions such as, for example, routing, interfacing, format or protocol conversion, storage, buffering and so on. For example, in one embodiment a gateway can be equipped for interfacing various terminals 114 with transaction processing network 123 or with various entities in transaction processing network 123. Further, in one embodiment, a gateway can be included to provide interfaces among various entities involved in the transaction. In terms of the example environment, a gateway may provide a common interface between a plurality of merchants and their terminals 114 on the one hand, and various banks, institutions or other entities on the other hand. Functionality that might be included in a gateway 120 can be, for example, protocol translation, data formatting, impedance matching, rate conversion, fault isolation, signal translation, buffering and storage, routing, or other functions as necessary or useful to provide interoperability or communications among transaction participants.

Gateways can be implemented using hardware, software, or a combination thereof. In one embodiment, gateway 120 is implemented as one or more processing devices configured to run software applications for the gateway functionality. In one or more embodiments discussed in this document, functions such as encryption, decryption, key storage and other related functions are at times discussed as being performed at or by a gateway. This description encompasses implementations where functions are performed using a separate module or appliance called by or otherwise accessed by the gateway. For example, in one or more embodiments, these functions are described as being performed by a secure transaction module that can be either a part of the gateway or accessed by the gateway. As will be apparent to one of ordinary skill in the art after reading this description, such discussion can indicate that the same devices that perform gateway functionality can also include hardware or software modules used to perform these encryption, decryption or other functions as well.

Alternatively, separate modules can be in communicative contact with the gateways and their functions called, accessed or used by the gateway to perform the encryption, decryption or other related functions. Indeed, in one embodiment, one or more separate appliances are provided to perform various decryption, encryption, key storage and updating and other functions, and the appropriate transaction data routed to the appropriate appliance for processing. Such appliances can themselves be implemented using hardware software or a combination thereof, and can be coupled in communicative contact with the gateway. As discussed herein, such appliances (sometimes also referred to as secure transaction modules) can be associated with entities other than the gateway, including issuing banks, acquiring banks, clearing houses, merchants and other entities that may be associated with, the transaction processing network 123.

In a step 98, the encrypted information is decrypted for processing of the transaction. In the example illustrated in FIG. 2, the transaction data stream or other appropriate transaction data is routed to the transaction processing network 123 entity or entities that will perform the authorization or other approval.

In a step 99, an authorization response is provided from the transaction processing network 123 indicating the status of the authorization. For example, where the transaction is approved, such authorization is transmitted to terminal 114 and can be stored at the terminal or in a storage device associated with the terminal for record-keeping purposes or further transactions. For example, considering again the application in a credit card transaction, when the initial transaction is carried out, terminal 114 typically seeks authorization from the transaction processing network 123 and, once authorized, stores transaction information in a data file or other database for later settlement of the transaction. Thus, in this example, terminal 114 could store information associated with the authorized transaction for later settlement as illustrated by step 100.

In one embodiment, the encrypted information is stored as data in one of the tracks on the card. Typically, magnetic stripe cards, including most bank or credit cards have three tracks of data. For the access information, Tracks 1, 2 or 3 can be used. Note that in one environment, a conventional bank card may have traditional track 2 information encoded at 75 BPI. The tracks may not be perfectly timed and may include variations or jitter. In other words, the spacings between the transitions may vary from transition to transition and from card to card. Additionally, because of these variations and the characteristics of the flux patterns on the magnetic strip, it is difficult to accurately recreate, or copy, magnetic stripe data from an original token to a new token and maintain the same characteristics. These transition characteristics create a level of uniqueness in the magnetic stripe data. Furthermore, because of these variations, the relationship of the tracks to one another may be affected. Therefore, it may be useful to encipher the data using a variable length block encoding cipher for increased security as well as coping with the inherent variability of the magnetic stripe record.

In an embodiment of the invention measuring RSV (relative spatial variation) in the placement specific events on the magnetic stripe is used to determine fraudulent magnetic stripes. As noted above the card's magnetic slurry noise can contribute to variation from ideal in the placement of flux transitions, it is one of many sources of deviation in placement location. Other error inducing factors can include inaccuracy in card velocity during swiping through the card reader, timing generation during the write cycle, spacing variations between the spacing of the write head from the magnetic slurry due to imperfections in the slurry surface, card deformation, including warpage, and head rotation from the card movement, variable coercivity of the slurry, and the temperature of the slurry during the write operation.

The RSV signature in an embodiment contains no information on the actual or measured magnetic stripe jitter as defined in the ISO 7811 specification. It does contain information on the RSV around specific events in the track data. In one embodiment, the RSV signature is created by mathematically combining the multiple read events. For example, in one embodiment, a multiple of average of varying sized windows around a specific event is used to generate an averaged deviation. By performing multiple window averaging over small sections of the magnetic stripe data and normalizing the results to a constant, the resolution of the cumulative reading is increased and the error effects introduced by a linear effect such as thermal expansion is minimized. This multiple window averaged deviation is then compared to the next multiple window averaged deviation and if equal or greater, the corresponding signature bit is set to one, otherwise the corresponding signature bit is set to zero. However, windowing is only one of several possible implementations of average deviations that may be implemented. A single window width may be used, multiple window widths and interdigitated averaging to look for periodicity in the signature may also be used.

In another embodiment, the specific focus of the multiple window event referred to the comparison point is the location of track data bits corresponding to one. In yet another embodiment the multiple averaged windows around the track data bits may contain four components. A window of the current (one) cell time, a second window of the current cell time plus the preceding and following two bit times (2:1:2), a third window consisting of the current bit time plus the preceding and following four bit times (4:1:4), and the fourth window consisting of the current bit time plus the preceding and following eight bit times (8:1:8). The 8:1:8 windows are used for normalizing the data to the standard base value, in this embodiment a cone data cell boundary of track two data. The one data point, 2:1:2 and 4:1:4 normalized values are averaged together and used to generate the corresponding signature bit as indicated.

Figure 4:
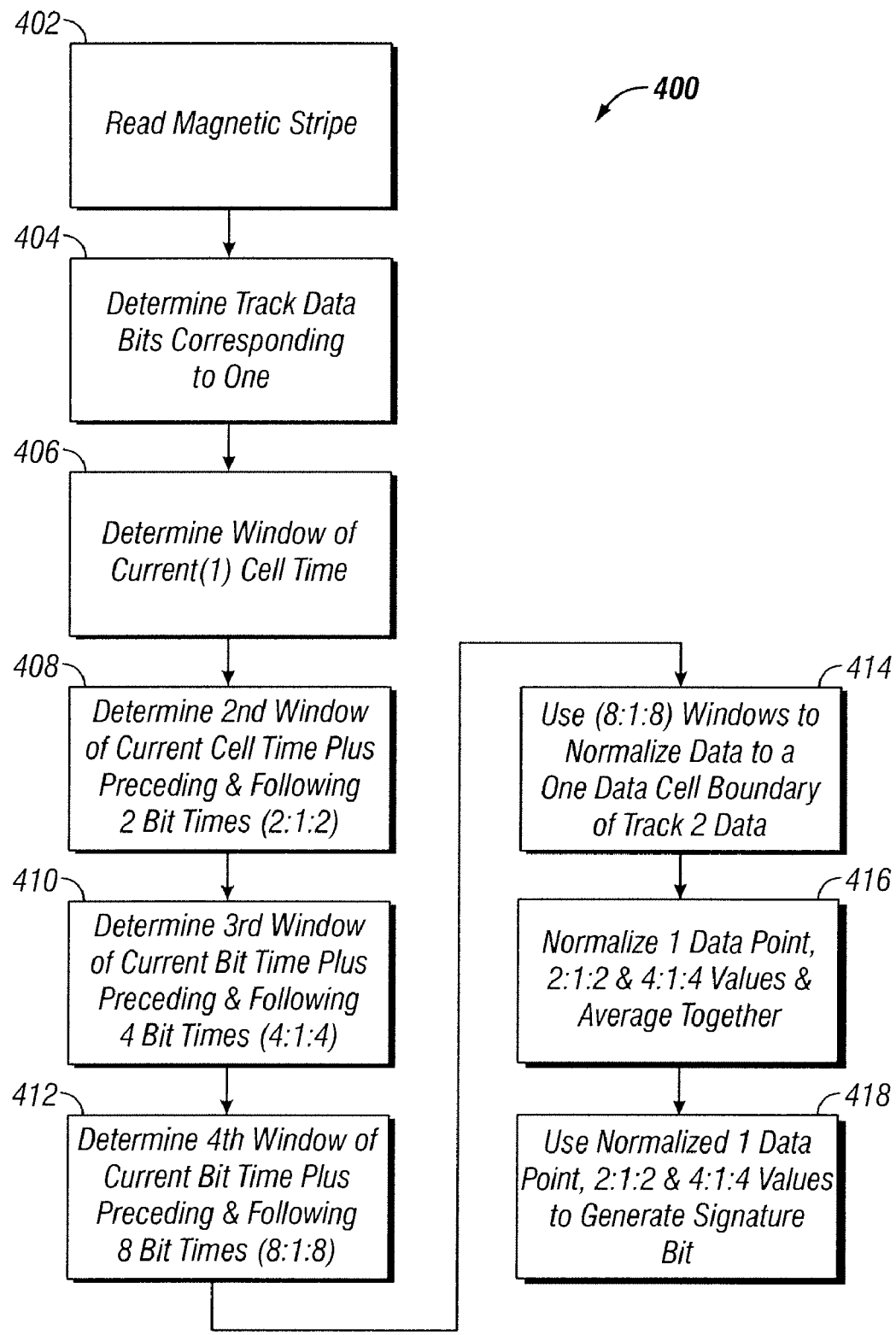
FIG. 4 is a flowchart illustrating multiple window averaging according to an embodiment of the invention.

FIG. 4 describes the steps of the above process in one embodiment. The process, 400, begins when the magnetic stripe is read in step 402. Once the magnetic stripe is read, a determination of the track data bits corresponding to one is made in step 404. Next, in step 406, a determination of the first window of current (1) cell time is made. In step 408 a second window of current cell time plus the preceding and following two bit times (2:1:2) is made. In step 410 a third window of the current bit time plus the preceding and following four bit times (4:1:4) is made. In step 412 a fourth window of current bit time plus the preceding and following eight bit times (8:1:8) is made. The next step in the process, 414, uses the (8:1:8) windows to normalize the data to a once data cell boundary of the data on track two of the magnetic stripe. In step 416 the (2:1:2) and (4:1:4) values are normalized and averaged together. The normalized (1) data point, (2:1:2) and (4:1:4) values are used to generate the signature bit in step 418.

In still another embodiment, the normalized average values (NAVs) are compared to a constant value rather than the next NAV to generate the signature bit. The signature is a series of bits with each bit corresponding to a specific event. In one embodiment each bit corresponds to a data point of one in the magnetic stripe data. In another embodiment, each bit corresponds to one of the first sixty-four, one data points in the track data. In a still further embodiment, each of the sixty-four data points are selected to meet specific criteria such as the most consecutive one data points to the least number of consecutive one data points. While sixty-four bits is a suitable size for some application, the number of selected points may be increased or decreased and the points of interest selected to suit the particular application situation. In a further embodiment, the points of interest are selected such that the points are located on alternate data tracks. This embodiment uses similar multiple window averaging to generate the NAVs.

The method according to one embodiment uses all available authentic signatures to create a signature mask to be applied to future signature data. The signature mask comprises two components: a comparison value and a weighting value dependent on the comparison results. If a particular comparison point is the same value for all previous signatures the weighting factor is set to the maximum value. If the comparison point is not the same value for all previous signatures, a weighting factor between zero and the maximum is calculated, based on the amount of agreement between signatures. If there is no strong correlation at a particular comparison point the weighting factor of zero causes the point to be ignored. The mask and weight are then used to create an authentic score by comparing each comparison point with the mask and updating the score based on the result and weight. For a good comparison, an amount based on the weight is added to the score tally. For a bad comparison, a value is deducted from the tally based on the weight. The amount added or subtracted for a particular weight can be equal or adjusted, with a bad comparison causing a larger tally deduction than a good comparison.

Figure 5:
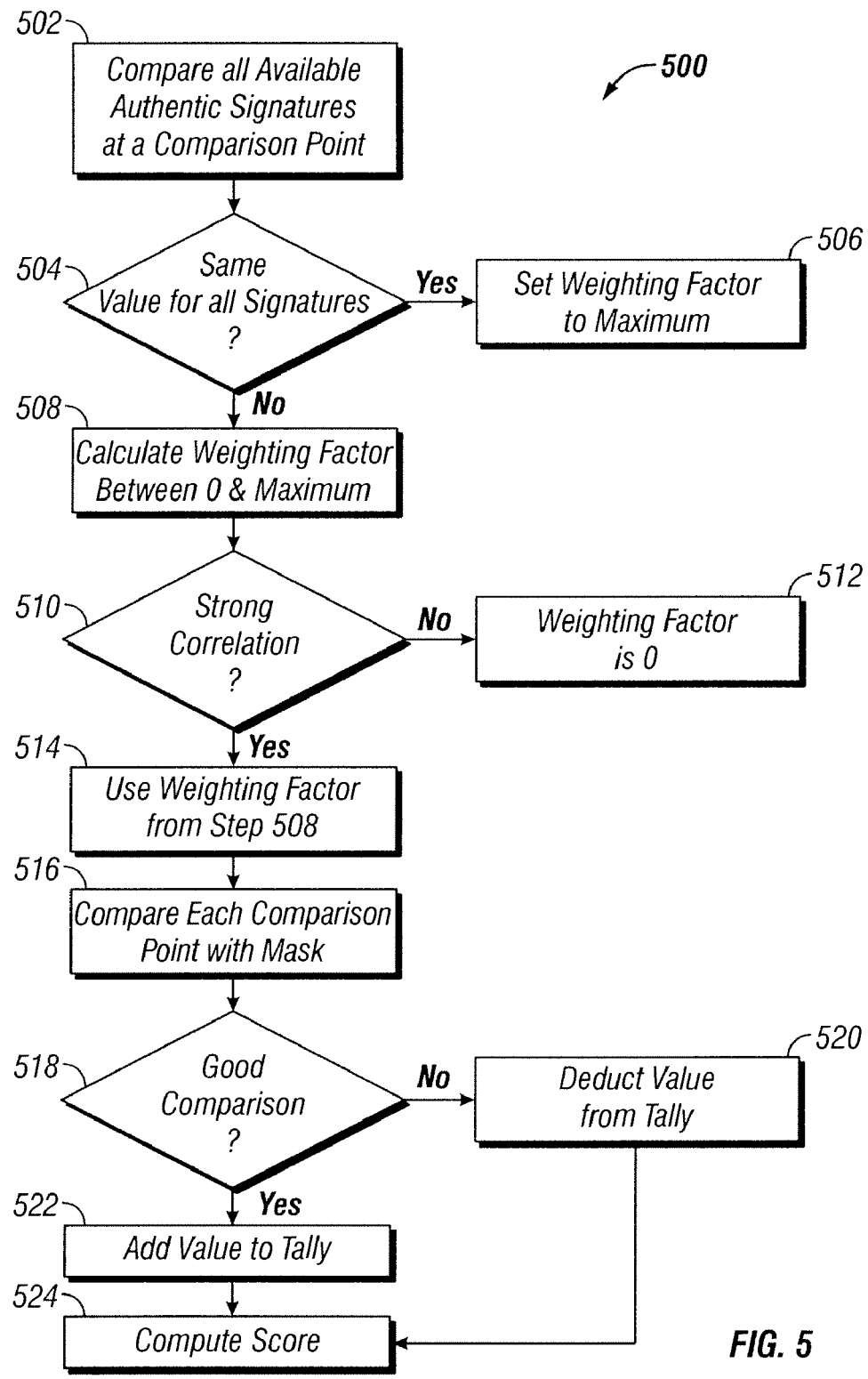
FIG. 5 is a flowchart illustrating creation of a signature mask according to an embodiment of the invention.

FIG. 5 describes an example of the process above. The process, 500, compares multiple (for example, all) available authentic signatures at a comparison point at step 502. The first examination determines if the same value is found for all signatures, step 504. If the same value is found for all signatures the weighting factor is set to the maximum value in step 506. If the same value is not found in all signatures, then a weighting factor between zero and the maximum value is calculated in step 508. The next step, 510 asks how strong the correlation between the signatures is. If the correlation is not strong, step 512 sets the weighting factor to zero. If there is a strong correlation, in step 514 the determination is made to use the weighting factor from step 508. In step 516 each comparison point is compared with the mask. The comparison is tested in step 518. If the comparison is not good, then the value is deducted from the tally in step 520 and the score is computed in step 524. If the comparison is good the value is added to the tally in step 522 and the score is computed in step 524.

In an embodiment four signatures are used to create the mask and weight. The mask includes the preferred data value and the weight is based on the level of agreement between all samples of the data value. If all four signatures agree on a data value for a particular comparison point the weight is set to 2 for an agreement with the test signature value and to −4 for disagreement, with the test value representing a 2:−2 weight. If three signatures agree the weight is set to 1:−2. That is, if the test signature point compares to the mask, then one or two is added depending on the weight. If the test signature point does not match, either two or four are subtracted. In the embodiment described the test signature count is the summation of the comparison weights for all comparison points with a weight greater than zero. It should be noted that while the preferred embodiment uses a summation of all comparison point scores, other functions such as the square of the deviation could also be used.

In another preferred embodiment a variable number of reference signatures are used to create the mask and weight. In this embodiment the weight factor is changed based on the number of reference signatures used. For a reference signature with only one signature a weight factor of 1:−1, results in a maximum score equal to the number of comparison points. In the case of an eighth byte signature sixty-four comparison points are used, making the maximum and minimum count 64; −64. If four reference signatures are available, as described above, a weight factor of 2;−2 can be used, resulting in a maximum count of 128. If ten reference signatures are available, a weight factor of 10;−10 could be used to give a maximum count of 640. To allow the number of reference signatures, and hence the maximum score to be used for any number of available reference signatures, the signature count is normalized to a signature score using one of a variety of functions. In the case of this embodiment, the signature count is divided by the signature maximum count and the result is a signature score between zero and one. Once a test signature is compared to the signature mask and deemed valid it is added to the reference signature list up to the predetermined maximum signature list size.

In still another embodiment, the reference signature list is a first in first out memory, allowing a predetermined number of the most recent confirmed signatures to be applied to the test signature for verification. In this manner the system automatically adjusts for card usage and aging factors.

In another embodiment the rejected test signatures are recorded for future comparison to other rejected signatures. Groups of the rejected signatures with similar values are used to generate a signature mask for the rejected card. Any test signature that fails the mask for the known good signature is then compared to these rejected signature masks and used to ascertain the likelihood that the rejected card is being used multiple times. An alert may then be set. If the rejected signature proves to be from a valid magnetic stripe, then valid as well as rejected masks can be compared to determine the fault condition causing the erroneous rejection. The mask and verification routines may then be updated to prevent recurrence.

In the forgoing preferred embodiments, each test signature and signature mask comparison point is considered as being in one of two states. While this maximizes the number of comparison points for a specific signature length, in some cases it might be desirable to look at fewer points, but with greater resolution. The previously described embodiments can be modified to provide this functionality. In one preferred embodiment using enhanced per point resolution, each comparison point can take on one of four values. The weight for each value is dependent on the number of reference signatures available. In one embodiment requiring high comparison point resolution, the mask consists of a table with four entries for each comparison point. Each entry contains the weighting factor for that entry in the comparison process, along with the test signature and the weighting values for the other possible combinations. In one case the four entries for a comparison point in the test signature indicate if comparison point A is greater than one; the second point is greater than zero and less than one; the third point is less than zero and greater than or equal to minus one; and the final entry is less then minus one. FIG. 6 represents one configuration for this embodiment. The test row represents the test signature value for a comparison point. The mask row represents the mask value for a comparison point. The score represents the weighting factor to apply to the point which is a combination of the comparison of mask to test as well as the number of reference signatures C used to create the mask. W*C is then applied to all points where the mask and test are equal. W1*C is applied to all points where the mask and test are separated by one bracket of the comparison i.e. the test is zero to one while the mask is greater than 1.

Resolution and signature size can be tailored to accommodate more than the described one and two bit resolution per comparison point mask/weighing systems. The eight byte signature described previously can define a mask with 64 points of a resolution of one bit, or eight points with a resolution of eight bits per point.

A preferred embodiment consisting of sixty-four points with a resolution of one bit per point is described below. Each bit of the signature reflects the comparison of the indicated point to other points in the vicinity of the indicated points through multiple averages. The comparison points are selected to be the bit cell locations representing a one data bit. First, the average of the eight previous bit cell times is taken, then the following eight bit cell times and the comparison point bit cell time is calculated. This is known as the 818A average. The 818A average is calculated as a percentage of a standard bit cell time. In the case of ISO 7811 track two data at 75 bits per inch the standard bit cell length (SBCL) is 338.6666 um. SBCL divided by 8-1-8A is 8-1-8D, which is the deviation from the standard bit cell time to the actual bit cell time for the area of the magnetic stripe being tested. Other areas of the magnetic stripe will have different deviations from the standard. Next, the 2-1-2A and 4-1-4A averages are calculated in the same manner as the 8-1-8A average. The bit cell comparison point length 1A, the 2-1-2A length and the 4-1-4A length are then correlated to the standard SBCL using the 818D percentage deviation as a multiplier. The correlated 1A, 2-1-2A, and 4-14-A average bit cell lengths are then divided into the SBCL generating the 1D, 2-1-2D, and 4-1-4D deviations. The 1D, 2-1-2D, and 4-1-4D deviations are then averaged, creating the multiple point averaged deviation (MPAD) for the one data bit cell length comparison point. The MPAD for all sixty-four comparison points (C) is then calculated and each MPAD is compared to the next MPAD. If $MPAD_n >= MPAD_{n+1}$. Then, $C_n = 1$ Else $C_n = 0$ For N=1.64

In another embodiment the generation of the one bit per cell length signature for each MPAD is compared to zero deviation from the SBCL, rather than to the next MPAD. If $MPAD_n >= 0_{n+1}$. Then $C_n = 1$ Else $C_n = 0$ For N=1.64.

While an embodiment uses 8-1-8D, 4-1-4D, 2-1-2D, and 1D bit cell length averages, other embodiments may use a different number of points for each average, such as 16-1-16, 8-1-8D, 2-1-2D, and 1D. Also, a different number of deviations per comparison point may be averaged, such as 16-1-16, 8-1-8D, 4-1-4, 2-1-2D, and 1D, and used to calculate the MPAD. It can be also readily seen that the comparison point may be other features than a one bit cell time. In an embodiment the comparison feature is the distance from the beginning of a one bit cell to the end of the next one bit time for data consisting of two consecutive one data points. In yet another embodiment the comparison point is the distance from the beginning of a one bit cell time to the closest flux transition on an adjacent track.

Another embodiment consists of thirty-two points with a resolution of two bits per point. MPAD is calculated as described above. The average track deviation (ATD) from SBLC is then calculated using all bit cell lengths between the start sentinel and the LRC character inclusive. The positive and negative average track deviation is compared to the MPAD for all points, creating a set point (SP+, SP−) where half of the MPAD's are above and half are below the set point. $C_n$ is then calculated based on the degree of deviation from the next MPAD being above or below the SP:

```
For n = 1 To 32
    If MPAD_n-MPAD_{n+1} >= SP+
        Then C_n = 4
    Else If MPAD_n-MPAD_{n+1} >= 0
        Then C_n = 3
    Else If MPAD_n-MPAD_{n+1} <= SP-
        Then C_n = 2
    Else
        C_n = 1
Next n
```

Other characteristics of the magnetic stripe data besides the length between flux transition points may be used as the comparison focus for signature generation. In another embodiment, the slope of the flux transition is measured as the distance between one point on the magnetic stripe data such as a peak, and another point such as crossing the zero reference is used to calculate a MPAD, and from that a signature using any of the above-described methods. In a still further embodiment, one of the comparison points may be the location of any spurious noise pulse, as defined in ISO 7811-6, having high coercivity over a specified magnitude.

In another embodiment the MPAD points are ranked from least deviation to greatest deviation, greatest deviation to least deviation, or any other desired ranking method. The MPAD's with the closest correspondence as determined by the chosen ranking method are then output by the MPAD location within the magstripe data. As an example, in the case that MPAD's are located at the one data points within the magstripe data the first sixty-four MPAD's are ranked in order of the lowest deviation to greatest deviation from the SBCL. The twelve MPAD's closest to zero are then output in order as a five bit value representing the bit location within the sixty-four test points. The signature consists of five times twelve or sixty bits, or eight bytes. In a further embodiment, the twelve MPAD's closest to zero are sorted based on those above and below zero. The output signature is ordered from the most negative MPAD to zero then to the most positive MPAD. The unused four bits in the eight byte signature give the offset to the MPAD closest to zero. Signatures generated in this manner are transmitted to the ranking service which creates a mask and weight based on one or more signatures. The mask is used to evaluate newly acquired signatures. If the new signature is considered valid it is then processed to increase the signature base used to generate the mask. The mask and weights are generated from the signatures by ranking location deviation between card swipes. In the case of four signatures, each signature MPAD is compared to the other signature MPAD and if all four signatures are in agreement for a particular MPAD location the weight for that MPAD is set to twenty-five. If three MPAD's are in agreement the weight is set to twenty. For two the weight is set to ten and set to 5 for one location. Each of the four signatures is then ranked based on the calculated weights and ranked from the most to least correspondence. The signature with the most correspondence is then compared to the others with respect to location deviation. If a MPAD location is ranked as one lower or higher than the same location in the signature then the result with highest correspondence is saved. A signature mask is built based on the rate of occurrence of a MPAD at each location. This is shown in the examples below:

Signature 1:
16,06,23,09,08,27,57,33,34,61,03,48
Signature 2:
06,23,16,09,08,27,34,57,33,62,48,03
Signature 3:
06,23,16,09,08,27,34,33,57,63,48,03
Signature 4:
16,06,23,09,08,27,57,33,34,64,03,48

The Mask MPAD Location/Weight Table shown in FIG. 7, is used as the mask and weight to evaluate new signatures. The first step in the process adds the weights for all locations where the new signature MPAD entry is found in the table. Next, each MPAD of the new signature that did not correspond to a MPAD location is compared to all entries in the table and given a weight based on the secondary weighting table, shown in FIG. 8.

Consider the example below:
Test Signature:
Deviation
Most − 0 Most +
20,16,06, 09,08,27,03,57,33,34,61,48

The primary and secondary table comparisons are shown in FIG. 9.
Comparison sum 150+45=195 of 300

The last comparison tables deduct weights for signature entries that are not included in the mask based on MPAD location, shown in FIGS. 10 and 11.

While the example signature mask has twelve MPAD's and weighting factors set as described, the number of MPAD's evaluated and the weighting value may be varied based on the evaluation system requirements. It should also be noted that the secondary table compare and the deduction table could be omitted in applications not requiring added accuracy.

In all of the forgoing descriptions the MSR signature is a description of the raw data encountered while reading the magnetic stripe. The data is processed and normalized to a standard value used by all MSR's in collecting this signature data. Due to manufacturing tolerances in the production of the devices used within the MSR to collect this data, there are slight differences from one MSR to the next in the data collected. During the initialization phase of the manufacturing the MSR it is desirable to calibrate the MSR's signature reading components by swiping a calibrated card and storing that information at the Verification Server (VS) for later use. In one embodiment the calibration card data is also used locally by the MSR to self-calibrate its signature data collection sub-system. In any reader, especially over time and other environmental conditions, all values may be collected with a slight positive or negative offset. Each MSR's accuracy may also change over time or other environmental conditions in collecting the raw data used to generate the MSR data signature.

To mitigate these variations in signature data collection, in a preferred embodiment a magnetic stripe calibration card (CC) is encoded with information in the same format as a required for a credit or debit card transaction. The data encoded on track two specifies that the card data is to be used for calibration not for a monetary transaction. In one embodiment the format follows that of a Semtek Command Card. The card is then read in a laboratory calibrate reference reader and the calibration data is written both to the VS and to track one with information in the same format as a required for a credit or debit card transaction.

In one embodiment, the CC (calibration card) is used during manufacture to calibrate the MSR and to initialize the VS (verification server) data base with the MSR (magnetic stripe reader) serial number and calibration data.

In another embodiment, the CC is used when the MSR is first deployed to calibrate and test the MSR with the VS by sending generated track information. The method used is similar to Semtek Command Card and allows the VS to compare the calibration data with the stored value and either enable the VS server for this MSR serial number or post a calibration error.

In yet another embodiment of a verification system the VS compares signatures from multiple MSR devices for a particular card and adjusts the signature mask to account for differences between MSR units for an identical magstripe card.

In yet another embodiment, the signatures from multiple MSRs can be collected and if a particular card is used at a particular MSR multiple times, then a signature mask for that MSR is created. This comparison is used for future comparisons in addition to the normal system wide process previously described.

Figure 12:
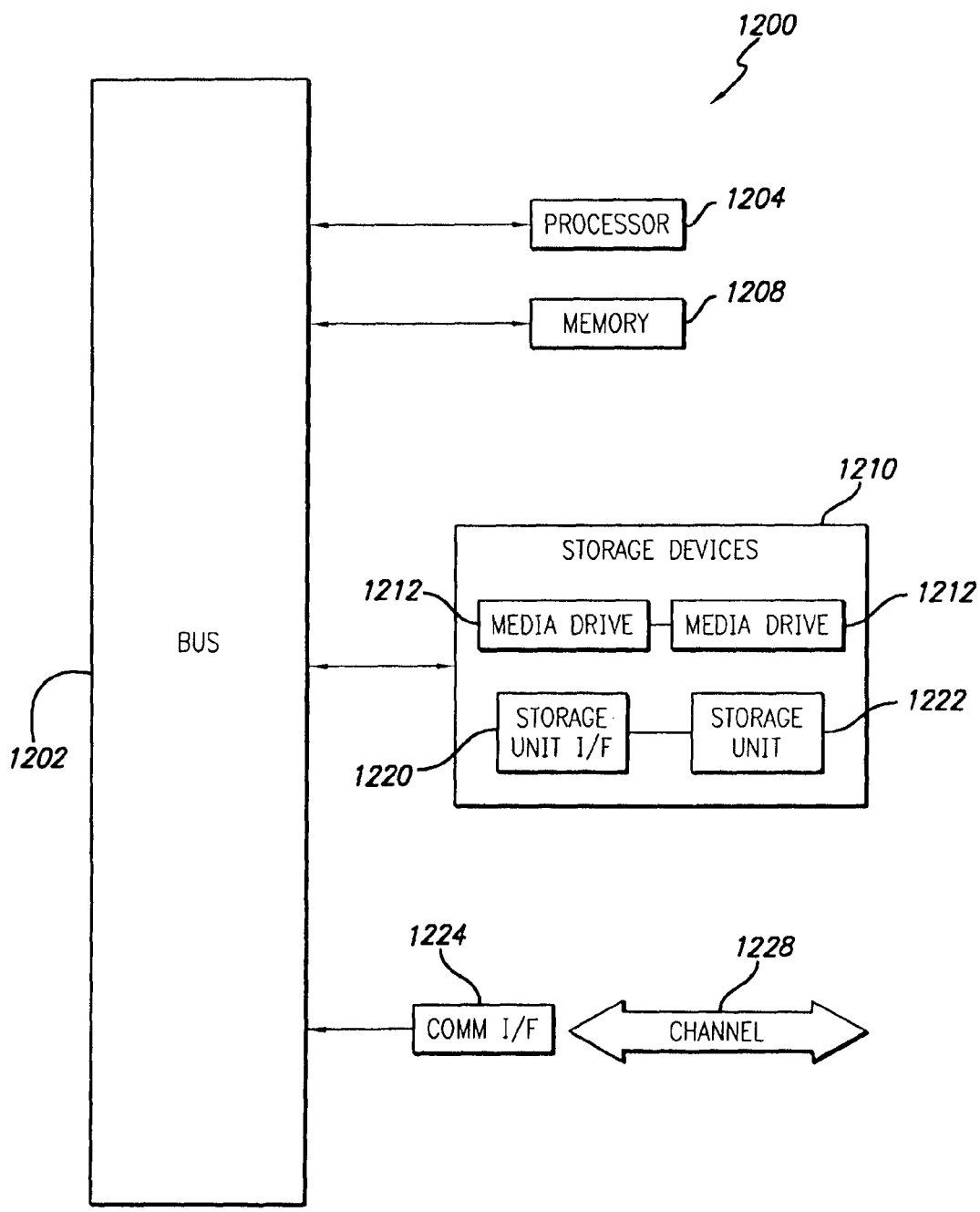
FIG. 12 is a diagram illustrating an example computing system with which software components may be executed.

As used herein, the articles "a" or "an" when referring to an item are not limited to requiring one and only one of the referenced item, and the various embodiments can include additional of the referenced items (or an alternative item) unless the context clearly dictates otherwise. As used herein, the terms "module" and "control logic" are used to describe a given unit of functionality that can be performed in accordance with one or more embodiments of the present invention. As used herein, a module or control logic can be implemented utilizing any form of hardware, circuitry, processing systems, software (including firmware), or a combination thereof. In implementation, the various control logic blocks or modules described herein can be implemented as discrete components or the functions and features described can be shared in part or in total among one or more modules and control logic items. Likewise, although a given item may be described as a module, that item may itself contain various modules to perform desired functionality. As would be apparent to one of ordinary skill in the art after reading this description, the various features and functionality described herein may be implemented in any given application can be implemented in one or more separate or shared modules or logic in various combinations and permutations.

Where features of the invention are implemented in whole or in part using software, in one embodiment, these elements can be implemented using a computing system capable of carrying out the functionality described with respect thereto. One such example computing system is shown in FIG. 12. Various embodiments are described in terms of this example computing system 1200. After reading this description, it will become apparent to a person skilled in the relevant art how to implement the invention using other computing systems or architectures.

Referring now to FIG. 12, computing system 1200 may represent, for example, desktop, laptop and notebook computers; hand-held computing devices (PDA's, cell phones, palmtops, etc.); mainframes, supercomputers, or servers; or any other type of special or general purpose computing devices as may be desirable or appropriate for a given application or environment. Computing system 1200 can include one or more processors, such as a processor 1204. Processor 1204 can be implemented using a general or special purpose processing engine such as, for example, a microprocessor, controller or other control logic. Processor 1204 may be connected to computing system 1200 by a bus or other similar architecture.

Computing system 1200 can also include a main memory 1208, preferably random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 can likewise includes a read only memory ("ROM") or other static storage device coupled to bus 1202 for storing static information and instructions for processor 1204.

The computing system 1200 can also include information storage mechanism 9120, which can include, for example, a media drive 1212 and a removable storage interface 1220. The media drive 1212 can include a drive or other mechanism to support fixed or removable storage media. For example, a hard disk drive a floppy disk drive, a magnetic tape drive, an optical disk drive, a CD or DVD drive (R or RW), or other removable or fixed media drive. Storage media 918, can include, for example, a hard disk, a floppy disk, magnetic tape, optical disk, a CD or DVD, or other fixed or removable medium that is read by and written to by media drive 1214. As these examples illustrate, the storage media 1218 can include a computer usable storage medium having stored therein particular computer software or data.

In alternative embodiments, information storage mechanism 1210 may include other similar instrumentalities for allowing computer programs or other instructions or data to be loaded into computing system 1200. Such instrumentalities can include, for example, a removable storage unit 1222 and an interface 1220. Examples of such can include a program cartridge and cartridge interface, a removable memory (for example, a flash memory or other removable memory module) and memory slot, and other removable storage units 1222 and interfaces 1220 that allow software and data to be transferred from the removable storage unit 1218 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a USB port), a PCMCIA slot and card, etc. Software and data transferred via communications interface 1224 are in the form of signals which can be electronic, electromagnetic, optical or other signals capable of being received by communications interface 9124. These signals are provided to communications interface 1224 via a channel 1228. This channel 1228 can carry signals and can be implemented using a wireless medium, wire or cable, fiber optics, or other communications medium. Some examples of a channel can include a phone line, a cellular phone link, an RF link, a network interface, a local or wide area network, and other communications channels.

In this document, the terms "computer program medium" and "computer usable medium" are used to generally refer to media such as, for example, memory 1208, storage device 1218, a hard disk installed in hard disk drive 1212, and signals on channel 1228. These and other various forms of computer usable media may be involved in carrying one or more sequences of one or more instructions to processor 1204 for execution. Such instructions, generally referred to as "computer program code" (which may be grouped in the form of computer programs or other groupings), when executed, enable the computing system 1200 to perform features or functions of the present invention as discussed herein.

In an embodiment where the elements are implemented using software, the software may be stored in a computer program medium and loaded into computing system 1200 using removable storage drive 1214, hard drive 1212 or communications interface 1224. The computer program logic (in this example, software instructions or computer program code), when executed by the processor 1204, causes the processor 1204 to perform the functions of the invention as described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the terms "module" and "appliance" or the depiction of a box in a diagram does not imply that the components or functionality described or claimed as part of that item are all configured in a common package. Indeed, any or all of the various components of an item, whether control logic or other components, can be combined in a single package or separately maintained and can further be distributed across multiple locations. Likewise, multiple items can be combined into single packages or locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A method for detecting forged magnetic stripe data, comprising:
   reading a magnetic stripe of a card to obtain signature data for a plurality of read operations;
   generating a signature mask based on the signature data;
   obtain data from a presented card;
   generating a signature from the presented card; and
   comprising the signature generated from the presented card to the signature mask to authenticate the presented card, wherein comparing the signature generated from the presented card to the signature mask uses an average of windows around a specific event and comprises:
   generating an averaged deviation; and
   normalizing the multiple window averaged deviations.

2. The method of claim 1, wherein a deviation is generated using mathematical computations.

3. The method of claim 1, wherein the signature data comprises a mathematical representation of a plurality of signatures obtained from the plurality of read operations.

4. The method of claim 1, wherein comparing the signature generated from the presented card to the signature mask uses interdigitated averaging.

5. The method of claim 1, further comprising;
   comparing the window averaged deviation with a next multiple window
   averaged deviation, and
   setting a signature bit to a value based on the comparison.

6. The method of claim 1, wherein the windows around a specific event are one size.

7. The method of claim 1, wherein the windows around a specific event vary in size.

8. The method of claim 1, where the specific event is a location of rack data bits corresponding to one.

9. The method of claim 1, where the multiple average of varying sized windows contains multiple components.

10. The method of claim 1, further comprising:
    comparing a normalized average value to a constant value; and
    generating a signature bit.

11. The method of claim 9, wherein each bit corresponds to a data point of one in a magnetic stripe data.

12. The method of claim 9, each bit corresponds to one of a first sixty-four one data points in a data track.

13. The method of claim 1, wherein a weight used to generate the signature mask and the weight is changed based on a number of reference signatures used.

14. The method of claim 1, further comprising:
    varying a weight used to generate the signature mask is based on a number of reference signatures.

15. The method of claim 14, wherein the signature mask is created by normalizing the at least one signature to an idealized signature.

16. A method for detecting forged magnetic stripe data, comprising:
    reading a magnetic stripe of a card to obtain signature data for a plurality of read operations;
    generating a signature mask based on the signature data;
    obtain data from a presented card;
    generating a signature from the resented card; and
    comparing the signature generated from the presented card to the signature mask to authenticate the resented card, wherein comparing the signature generated from the presented card to the signature mask uses a multiple average deviation of varying sized windows around a specific event; and
    generating an averaged deviation based on the generated signature mask.

17. A computer program product comprising a non-transitory computer readable medium having computer program logic embodied therein configured to cause a computer system to detect forged magnetic stripe data, comprising:
    first computer readable program code for reading a magnetic stripe of a card to obtain signature data for a plurality read operations;
    second computer readable program code for generating a signature mask based on the signature data;

third computer readable program code for obtaining data from a presented card;

fourth computer readable program code for generating a signature from a presented card and;

fifth computer readable program code for comparing the signature generated from the presented card to the signature mask to authenticate the presented card using an average of windows around a specific event, the fifth computer readable program code for comparing the signature comprising:

computer readable code for generating an averaged deviation; and computer readable program code for normalizing the multiple window averaged deviations.

18. A processor configured to detect forged magnetic stripe data, comprising:

control logic for reading a magnetic stripe of a card to obtain signature data for a plurality of read operations;

control logic for generating a signature mask based on the signature data; and control logic for comparing the signature generated from the presented card to the signature mask to authenticate the presented card using an average of windows around a specific event the control logic for comparing the signature comprising:

control logic for generating an averaged deviation; and control logic for normalizing the multiple window averaged deviations.

19. An apparatus for detecting forged magnetic stripe data, comprising:

means for reading a magnetic stripe of a card to obtain signature data for a plurality of read operations;

means for generating a signature mask based on the signature data;

means for obtaining data from a presented card;

means for generating a signature from the presented card; and means for comparing the signature generated from the presented card to the signature mask to authenticate the presented card using an average of windows around a specific event, the means for comparing the signature comprising:

means for generating an averaged deviation; and means for normalizing the multiple window averaged deviations.

* * * * *